United States Patent
Fang et al.

(10) Patent No.: US 10,428,930 B2
(45) Date of Patent: Oct. 1, 2019

(54) BALL SCREW WITH A COOLING PASSAGE

(71) Applicant: HIWIN TECHNOLOGIES CORP., Taichung (TW)

(72) Inventors: You-Xin Fang, Taichung (TW); Yu-Wei Chuang, Taichung (TW); Sheng-Hao Hong, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 105 days.

(21) Appl. No.: 15/786,135

(22) Filed: Oct. 17, 2017

(65) Prior Publication Data

US 2019/0113129 A1   Apr. 18, 2019

(51) Int. Cl.
*F16H 57/04* (2010.01)
*F16H 25/22* (2006.01)

(52) U.S. Cl.
CPC ..... *F16H 57/0497* (2013.01); *F16H 25/2204* (2013.01)

(58) Field of Classification Search
CPC .......................... F16H 57/0497; F16H 25/2204
See application file for complete search history.

(56) References Cited

U.S. PATENT DOCUMENTS

| | | | |
|---|---|---|---|
| 2002/0152822 A1* | 10/2002 | Chuo | F16H 25/2204 74/89.13 |
| 2003/0089187 A1* | 5/2003 | Liao | F16H 25/2204 74/424.81 |
| 2009/0308690 A1* | 12/2009 | Jiang | F16H 57/0497 184/5 |
| 2011/0154924 A1* | 6/2011 | Chiu | F16H 57/0497 74/89.43 |
| 2013/0081497 A1* | 4/2013 | Chiu | F16H 57/0497 74/424.86 |
| 2013/0112025 A1* | 5/2013 | Jeng | F16H 57/0497 74/424.81 |
| 2015/0107389 A1* | 4/2015 | Jeng | F16H 57/0415 74/424.81 |
| 2018/0231117 A1* | 8/2018 | Fang | F16H 57/0497 |

FOREIGN PATENT DOCUMENTS

| | | |
|---|---|---|
| TW | I230232 B | 4/2005 |
| TW | 200637986 A | 11/2006 |
| TW | M532003 U | 11/2016 |

\* cited by examiner

*Primary Examiner* — Terence Boes
(74) *Attorney, Agent, or Firm* — Wang Law Firm, Inc.

(57) ABSTRACT

A ball screw with a cooling passage includes a ball screw, a nut and a sealing unit. The nut is provided with the input and output cooling holes parallel to the axis, and the flat surface is provided with the guide groove. A first hole and a second hole are disposed between the guide groove and the input cooling hole and the output cooling hole, respectively, and then a sealing unit seals the guide groove, so as to form the cooling passage. The guide groove, the first hole and the second hole all extend along the axial direction of the nut, and the cooling passage can be formed simply by sealing the guide groove with the sealing unit, which effectively reduces the assembling steps and time, consequently decreasing the assembling cost.

6 Claims, 9 Drawing Sheets

BALL SCREW WITH A COOLING PASSAGE

BACKGROUND

Field of the Invention

The present invention relates to a ball screw, and more particularly to a ball screw with a cooling passage.

Related Prior Art

FIG. 1A is one of the figures of "a ball screw with a cooling passage" disclosed in Taiwan Patent Application No. 090106417, wherein two end caps 12 are disposed at two ends of the nut 11, and each of the two end caps 12 is provided with a plurality of grooves 121 in communication with a plurality of cooling hole 111 defined in the nut 11 to form a cooling passage for circulation of cooling medium. The cooling medium is fed into the cooling passage through an input hole to cool down the nut 11 to a predetermined temperature, and then the cooling medium which has absorbed the heat energy is discharged out of the cooling passage via an output hole. However, since this patent must be provided with two end caps 12 at two ends of the nut 11, and each of the two end caps 12 must be provided with a plurality of grooves 121 in communication with a plurality of cooling hole 111 of the nut 11 to form a cooling passage for circulation of cooling medium, as a result, the axial length of the nut 11 becomes too long, which will reduce the effective travel length of the nut 11.

FIG. 1B is one of the figures of "a nut with a cooling device" disclosed in Taiwan Patent Application No. 094114025, wherein continuously curved circulation grooves 141 are formed in the outer surface of the nut 14 and extend along the axial direction of the nut 14, and then covers 15 cover the circulation grooves 141 to form a cooling passage. However, the covers 15 are fixed to the nut 14 by way of soldering to turn the circulation grooves 141 into a closed cooling passage, which highlights the inconvenience of processing and maintenance. Besides, grinding operation should be performed after the covers 15 are soldered to the nut 14, which is laborsome and time-consuming.

FIG. 1C is one of the figures of "a ball screw with a cooling passage" disclosed in Taiwan Patent Application No. 105211596, wherein the nut 17 includes two end surfaces 171 and a radial surface 172. A plurality of axial holes 173 are formed in one end surface 171 and extend toward another end surface 171, and the axial holes 173 are arranged around the central hole 174 of the nut 17. In the radial surface 172 and adjacent to the two end surfaces 171 are defined two radial holes 175 in communication with the axial holes 173 to form an S-shaped cooling passage. However, the independent axial holes 173 are defined in one end surface 171 toward another end surface 171 of the nut 17, and each of the axial holes 173 must be sealed with a conical screw 176 and leak proof cushion, which makes the assembling operation difficult and time consuming.

The present invention has arisen to mitigate and/or obviate the afore-described disadvantages.

SUMMARY

One objective of the present invention is to provide a ball screw with a cooling passage which is capable of reducing the assembling cost.

Another objective of the present invention is to provide a ball screw with a cooling passage which is capable of improving the sealing property of the cooling passage.

To achieve the above objectives, a ball screw with a cooling passage in accordance with the present invention comprises: a screw includes an axis, an annular surface surrounding the axis, and an outer helical groove surrounding the axis and defined in the annular surface; a nut sleeved along the axis onto the screw, and including: an inner helical groove surrounding the axis and formed in an inner surface of the nut, a first axial end surface, a second axial end surface opposite to the first axial end surface, at least one flat surface, an input cooling hole and an output cooling hole defined in the first axial end surface and extending toward the second axial end surface, at least one guide groove defined in the flat surface, a first hole in communication with the at least one guide groove and the input cooling hole, a second hole in communication with the at least one guide groove and the output cooling hole, wherein the inner helical groove cooperates with the outer helical groove to form a load path for receiving a plurality of balls; and a sealing unit mounted on the flat surface of the nut and including a flat sealing surface for sealing the at lease one guide groove, so that the input and output cooling holes cooperate with the first hole, the at least one guide groove, and the second hole to form the cooling passage.

The nut is provided with the input and output cooling holes parallel to the axis, and the flat surface is provided with the guide groove. A first hole and a second hole are disposed between the guide groove and the input cooling hole and the output cooling hole, respectively, and then a sealing unit seals the guide groove, so as to form the cooling passage. The guide groove, the first hole and the second hole all extend along the axial direction of the nut, and the cooling passage can be formed simply by sealing the guide groove with the sealing unit, which effectively reduces the assembling steps and time, consequently decreasing the assembling cost.

Preferably, the nut is provided with three said guide grooves which are arranged in a parallel manner.

Preferably, the at least one guide groove of the nut further includes an annular shoulder portion, the sealing unit includes at least one leakproof member, a leakproof piece, and a cover, the at least one leakproof member includes a sealing portion for sealing the at least one guide groove, and an abutting portion for abutting against the annular shoulder portion, the leakproof piece is disposed on the nut and includes the flat sealing surface for sealing the guide groove and the at least one leakproof member, and the cover is fixed to the flat surface and presses against the leakproof piece.

To achieve the above objectives, another ball screw with a cooling passage in accordance with the present invention comprises: a screw including an axis, an annular surface surrounding the axis, and an outer helical groove surrounding the axis and defined in the annular surface; a nut sleeved along the axis onto the screw, and including: an inner helical groove surrounding the axis and formed in an inner surface of the nut, a first axial end surface, a second axial end surface opposite to the first axial end surface, a first flat surface, a second flat surface, an input cooling hole and an output cooling hole defined in the first axial end surface and extending toward the second axial end surface, at least one first guide groove defined in the first flat surface, at least one second guide groove defined in the second flat surface, a first hole in communication with the at least one first guide groove and the input cooling hole, a second hole in communication with the at least one second guide groove and the output cooling hole, and a third hole in communication with the first and second guide grooves, wherein the inner helical groove cooperates with the outer helical groove to form a load path for receiving a plurality of balls; and two sealing units mounted on the first and second flat surfaces of the nut, respectively, and each including a flat sealing surface for sealing the at least one first guide groove and the at least one second guide groove, so that the input and output cooling holes cooperate with the first hole, the at least one first guide groove, the third hole, the at least one second guide groove, and the second hole to form the cooling passage.

Preferably, the nut is provided with three said first guide grooves and three said second guide grooves, and the three said first guide grooves and the three said second guide grooves are all arranged in a parallel manner.

Preferably, the at least one first guide groove of the nut further includes a first annular shoulder portion, the at least one second guide groove of the nut further includes a second annular shoulder portion, each of the sealing units includes at least one leakproof member, a leakproof piece, and a cover, each of the leakproof members includes a sealing portion for sealing the first and second guide grooves, and an abutting portion for abutting against the first and second annular shoulder portions, the leakproof pieces are disposed on the nut and each include the flat sealing surface for sealing the first and second guide grooves and the at least one leakproof member, and the covers are fixed to the first and second flat surfaces and press against the leakproof pieces.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

DETAILED DESCRIPTION

Figure 1A:
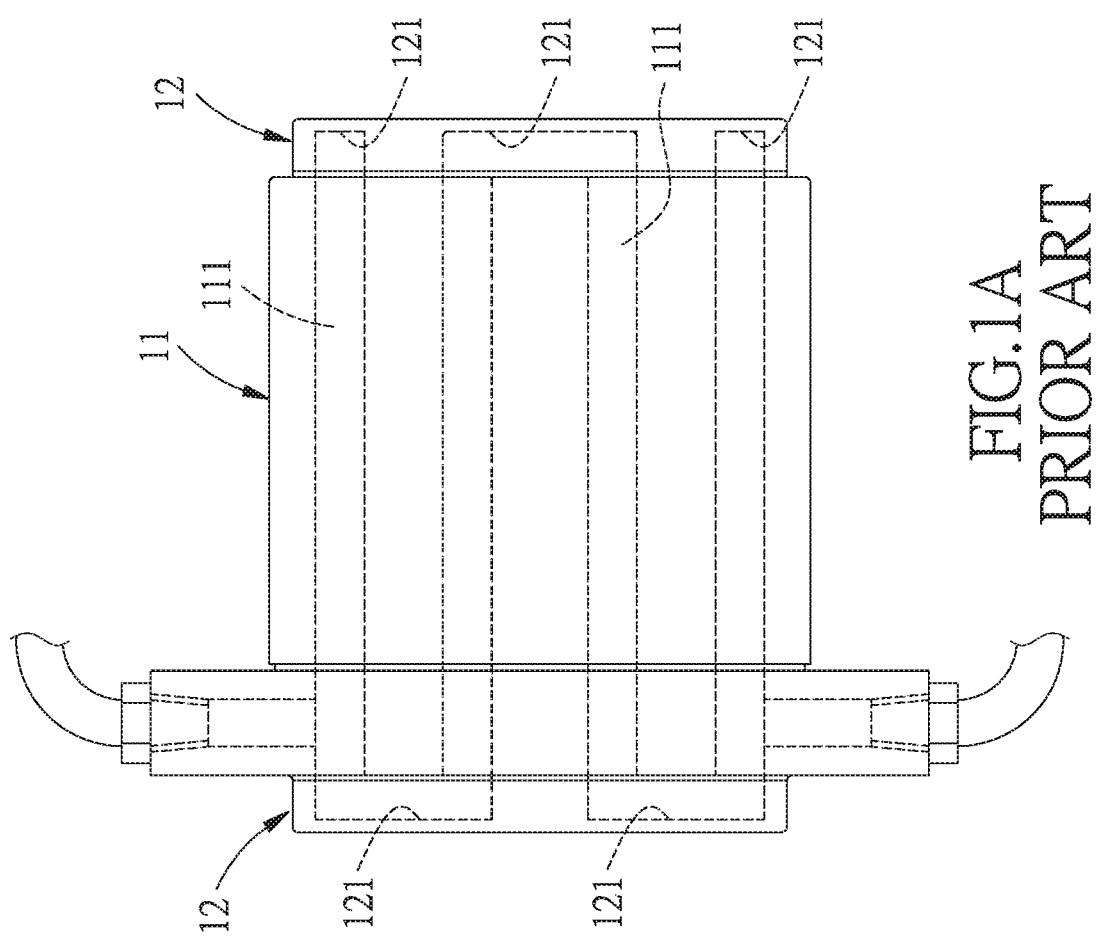
FIG. 1A is one of the figures of "a ball screw with a cooling passage" disclosed in Taiwan Patent Application No. 090106417.
Figure 1B:
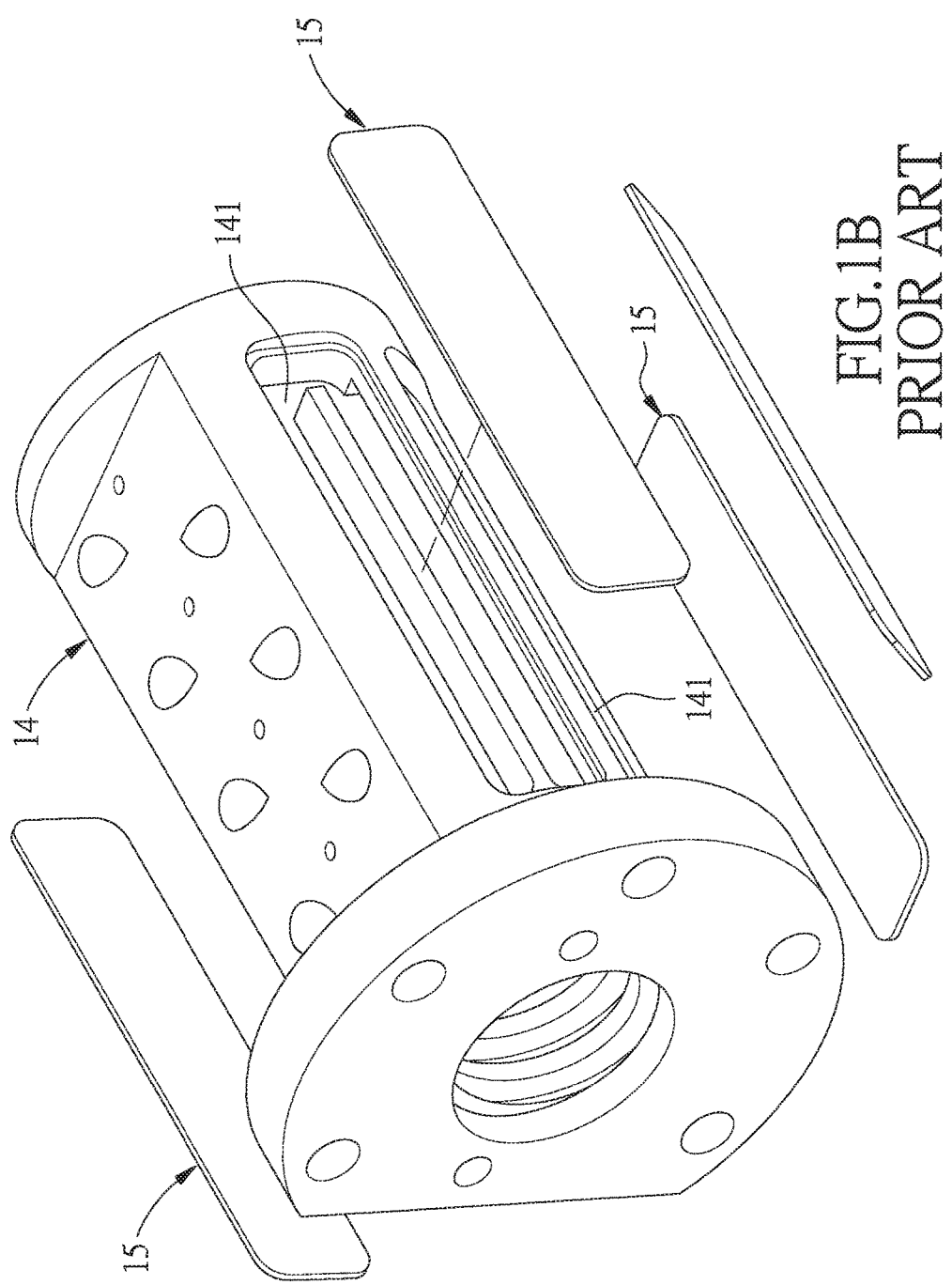
FIG. 1B is one of the figures of "a nut with a cooling device" disclosed in Taiwan Patent Application No. 094114025.
Figure 1C:
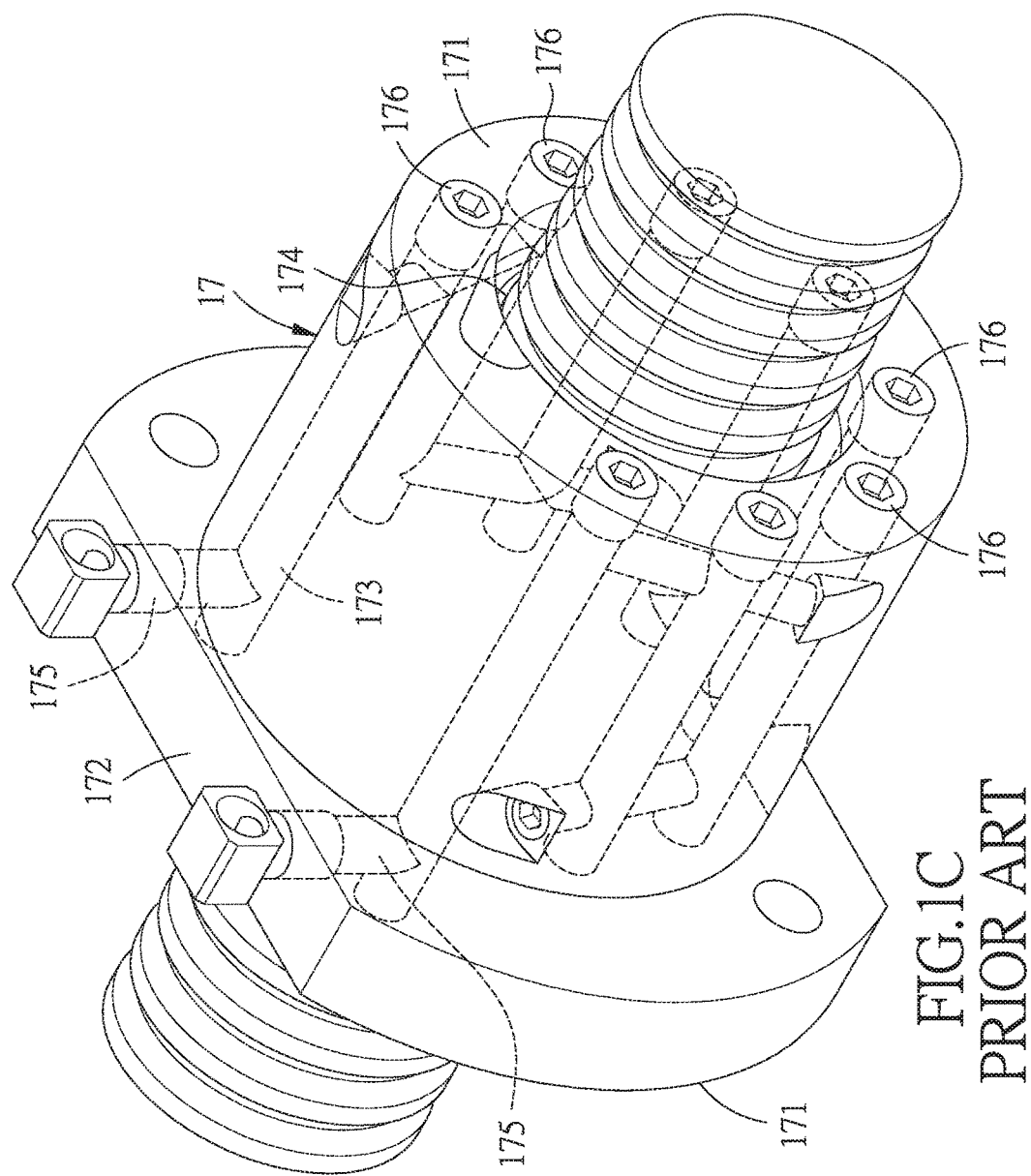
FIG. 1C is one of the figures of "a ball screw with a cooling passage" disclosed in Taiwan Patent Application No. 105211596.
Figure 2:
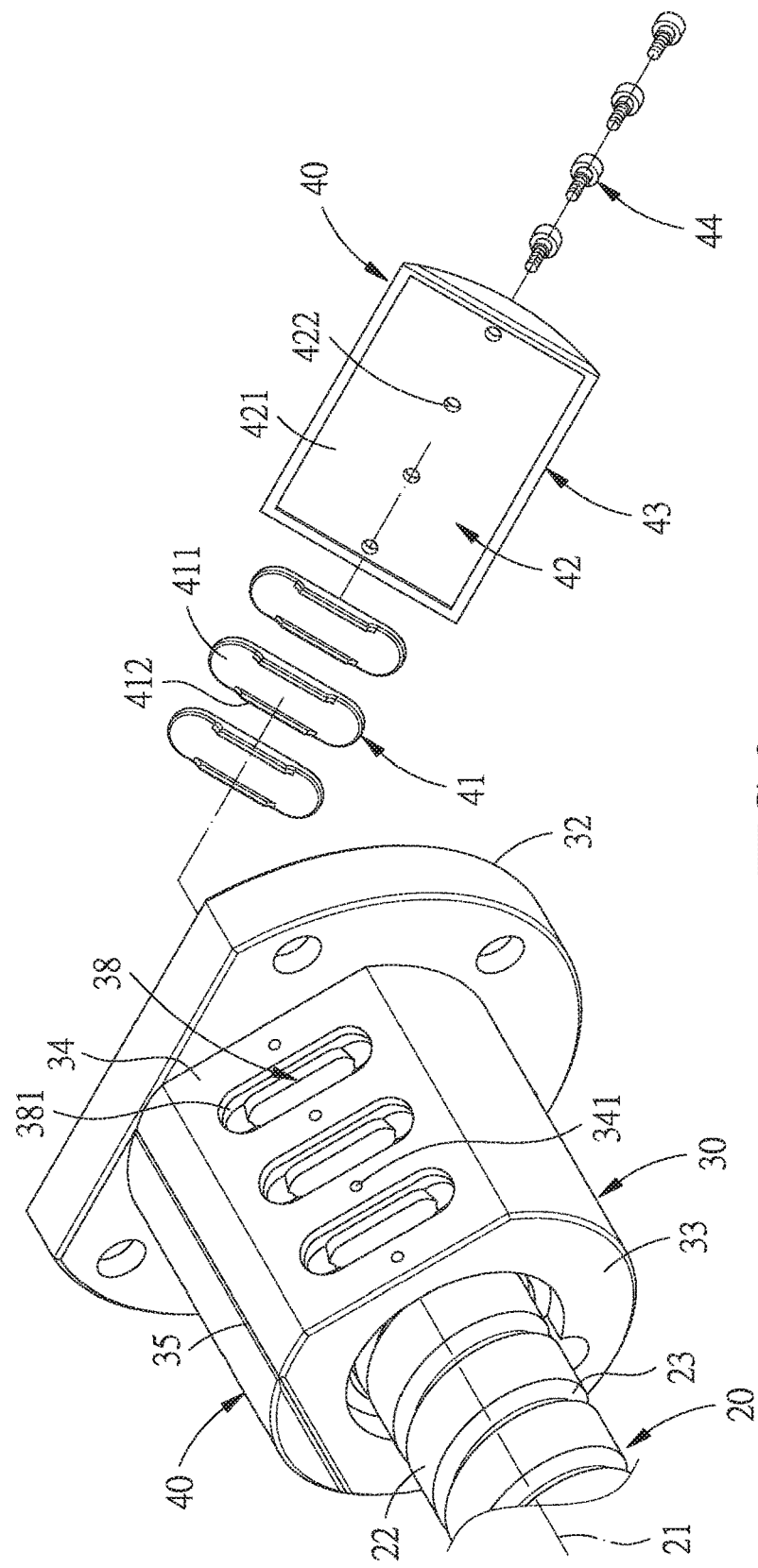
FIG. 2 is an exploded view of a ball screw with a cooling passage in accordance with a first embodiment of the invention.
Figure 3:
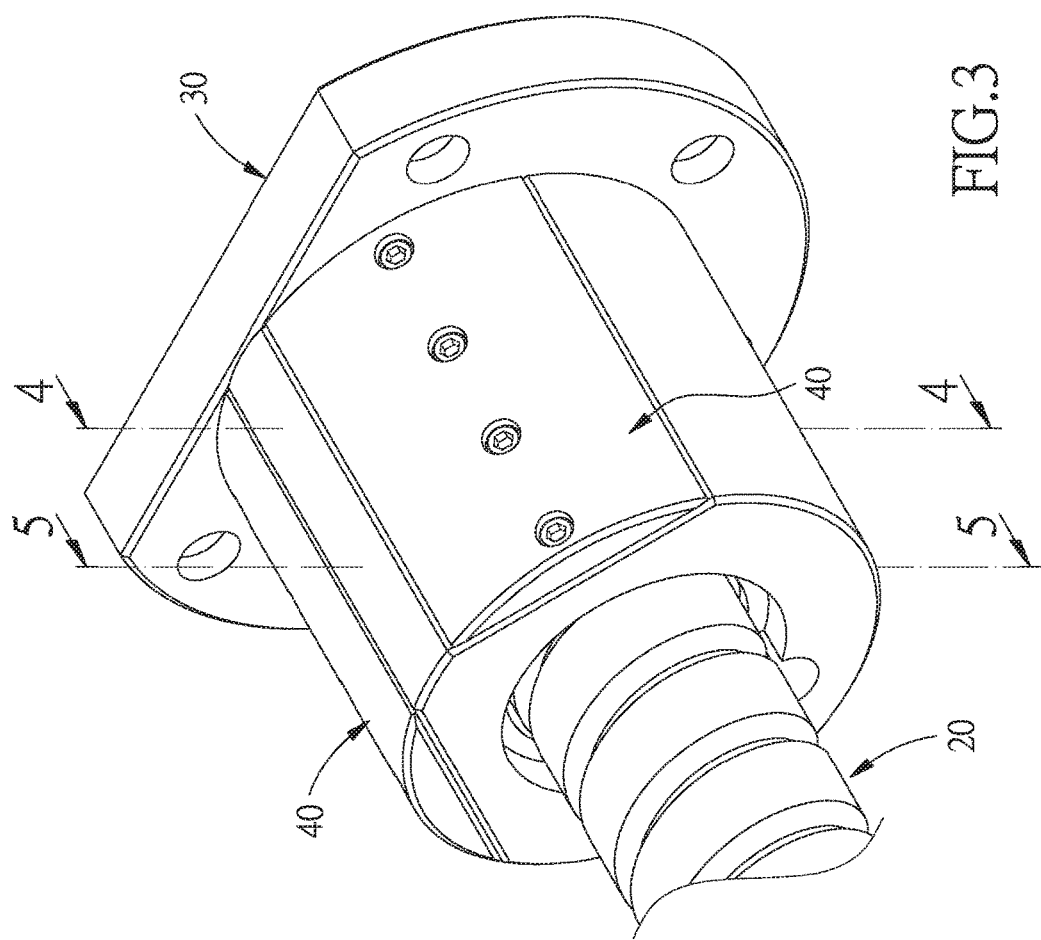
FIG. 3 is an assembly view of the ball screw with a cooling passage in accordance with the first embodiment of the invention.
Figure 4:
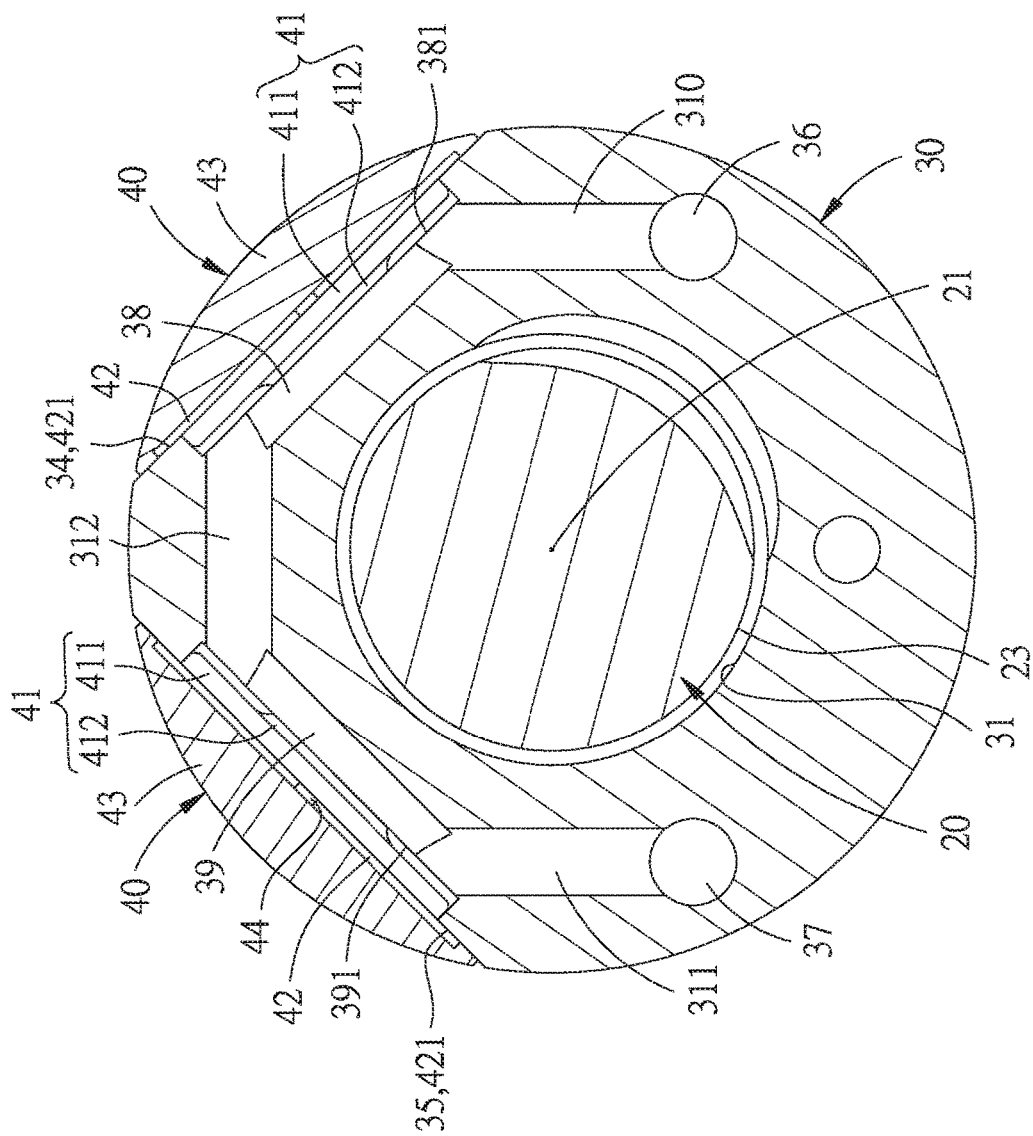
FIG. 4 is a cross sectional view taken along the line 4-4 of FIG. 3.

The present invention will be clearer from the following description when viewed together with the accompanying drawings, which show, for purpose of illustrations only, the preferred embodiment in accordance with the present invention.

Referring to FIGS. 2-6, a ball screw with a cooling passage in accordance with the first embodiment of the invention comprises: a screw 20, a nut 30 sleeved onto the screw 20, a plurality of balls 50 disposed between the screw 20 and the nut 30, and two sealing units 40 mounted on the nut 30.

The screw 20 includes an axis 21, an annular surface 22 surrounding the axis 21, and an outer helical groove 23 surrounding the axis 21 and defined in the annular surface 22.

Figure 6:
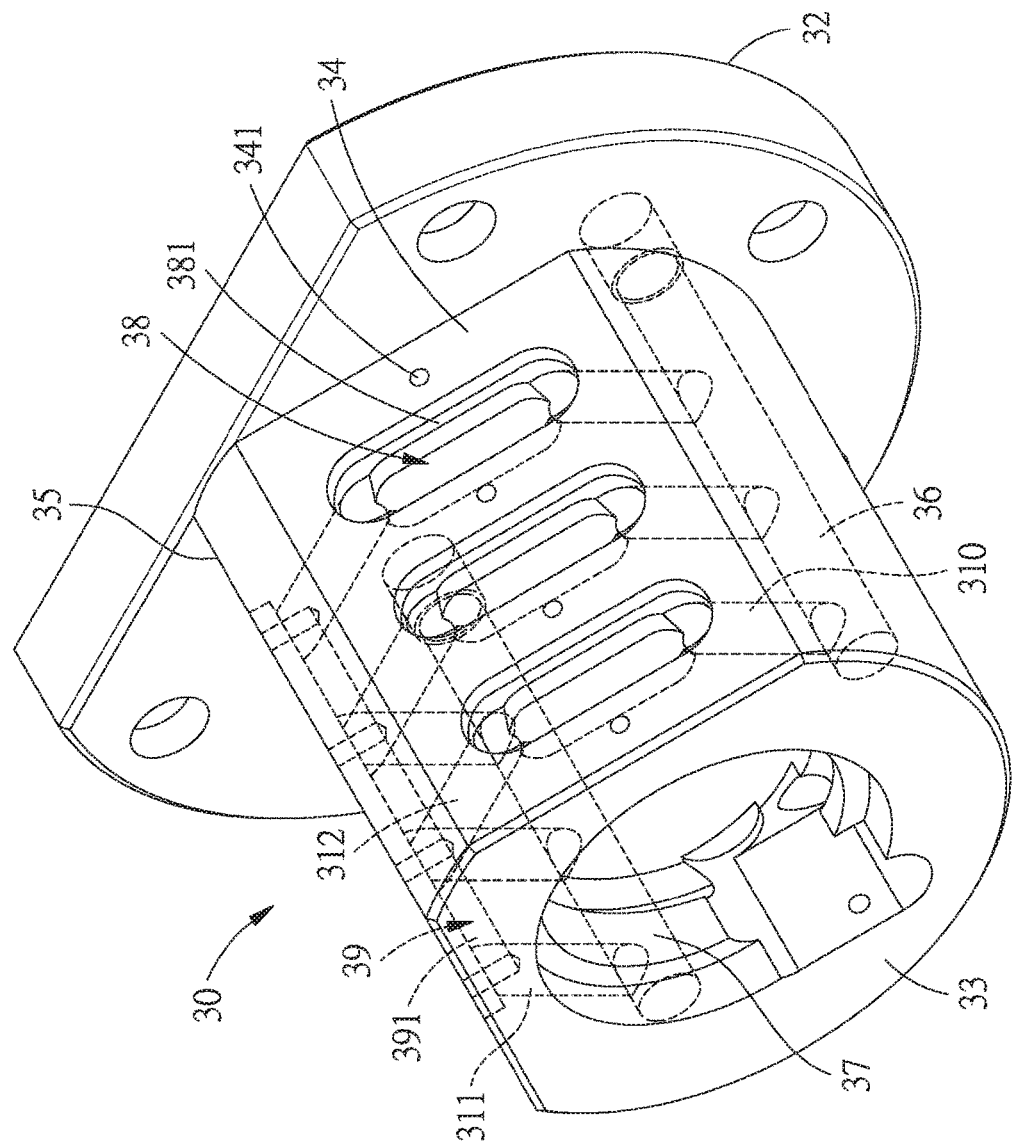
FIG. 6 is a perspective view of the nut of the first embodiment of the invention.

Referring to FIG. 6, the nut 30 is sleeved along the axis 21 onto the screw 20, and includes: an inner helical groove 31 surrounding the axis 21 and formed in an inner surface of the nut 30, a first axial end surface 32, a second axial end surface 33 opposite to the first axial end surface 32, a first flat surface 34 and a second flat surface 35 extending along the axis 21 and located between the first and second axial end surfaces 32, 33, an input cooling hole 36 and an output cooling hole 37 defined in the first axial end surface 32 and extending toward the second axial end surface 33, three parallel first guide grooves 38 defined in the first flat surface 34, three parallel second guide grooves 39 defined in the second flat surface 35, three first holes 310 in communication with the first guide grooves 38 and the input cooling hole 36, a second hole 311 in communication with the second guide grooves 39 and the output cooling hole 37, and a third hole 312 in communication with the first and second guide grooves 38, 39. The inner helical groove 31 cooperates with the outer helical groove 23 to form a load path for receiving a plurality of balls 50. In this embodiment, each of the first guide grooves 38 further includes a first annular shoulder portion 381, and each of the second guide grooves 39 further includes a second annular shoulder portion 391.

Figure 5:
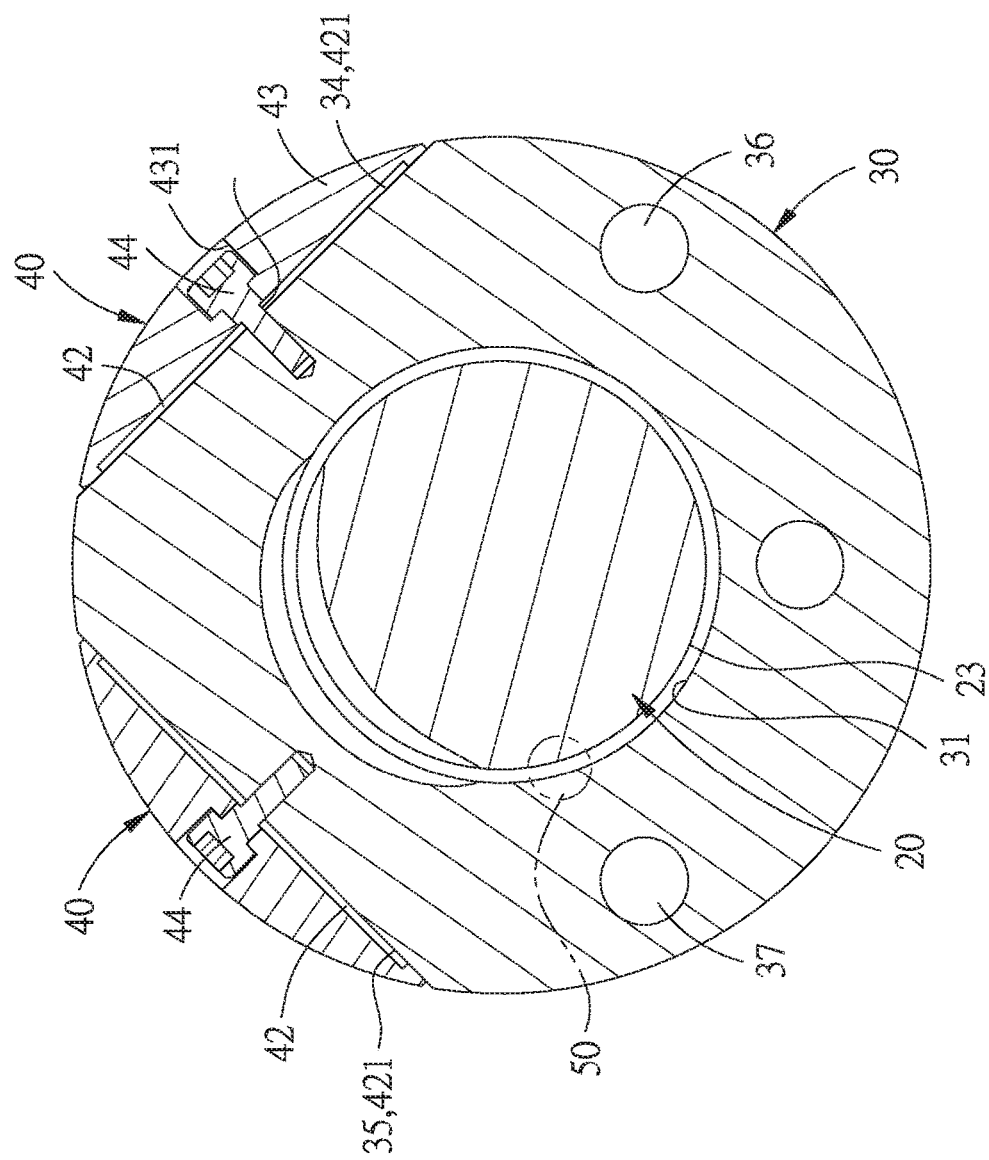
FIG. 5 is a cross sectional view taken along the line 5-5 of FIG. 3.

Each of the sealing units 40 includes three elongated leakproof members 41, a square leakproof piece 42, and an arc-shaped cover 43. Each of the leakproof members 41 includes a sealing portion 411 for sealing the first and second guide grooves 38, 39, and an abutting portion 412 for abutting against the first and second annular shoulder portions 381, 391. Each of the leakproof pieces 42 is disposed on the nut 30 and includes a flat sealing surface 421 for sealing the first and second guide grooves 38, 39 and the leakproof members 41. Each of the covers 43 is fixed to the first and second flat surfaces 34, 35 by countersunk head screws 44 to press against the leakproof pieces 42, so that the input and output cooling holes 36, 37 cooperate with each of the first holes 310, the first guide grooves 38, the third holes 312, the second guide grooves 39, and the second holes 311 to form a cooling passage. In this embodiment, as shown in FIG. 5, in order for the covers 43 to stably press against the leakproof pieces 42, so as to make the leakproof pieces 42 effectively seal the first and second guide grooves 38, 39 and the leakproof members 41, the first and second flat surfaces 34, 35 of the nut 30 are formed with threaded holes 341, 351, the leakproof pieces 42 are formed with through holes 422 aligned with the threaded holes 341, 351, and the covers 43 are each formed with countersunk head holes 431 aligned with the threaded holes 341, 351 for insertion of the countersunk head screws 44.

What mentioned above are the structure relations of the main components of the first embodiment, coolant liquid can be fed into the input cooling hole 36, flow through the first holes 310, the first guide grooves 38, the third hole 312, the second guide grooves 39 and the second hole 311, and finally is discharged from the output cooling hole 37, which forms a cooling path. The present invention possesses the following advantages:

First, reduce the assembling cost. The nut 30 is provided with the input and output cooling holes 36, 37 parallel to the axis 21, and the first flat surface 34 is provided with the three parallel first guide grooves 38, and the second flat surface 35 is provided with three parallel second guide grooves 39. The first guide grooves 38 are connected to the input cooling hole 36 via the first holes 310, the second guide groove 39 is connected to the output cooling hole 37 via the second hole 311, the first and second guide grooves 38, 39 are connected with one another by the third hole 312, and are then sealed with the sealing units 40, so that the input cooling hole 36 and the output cooling hole 37 can be connected to each of the first holes 310, the first guide grooves 38, the third holes 312, the second guide grooves 39, and the second holes 311 to form a cooling passage. It can be seen from the above description that the cooling passage is defined in the radial direction of the nut, and there is no cooling passage in the axial direction of the nut. Therefore, the present invention requires no conical screws to seal the cooling passage, which substantially reduces the use of screws. Besides, after the machining of the input cooling hole 36 and the output cooling hole 37, the first holes 310, the first guide grooves 38, the third holes 312, the second guide grooves 39, and the second holes 311 is finished, the ball screw with the cooling passage can be completed simply by locking the sealing units 40 to the nut 30 through a locking operation to seal the first and second guide grooves 38, 39, which effectively reduces the assembling steps and time, consequently decreasing the assembling cost.

Second, improve the sealing of the cooling passage. The cooling passage of the invention is formed by the input cooling hole 36 and the output cooling hole 37, the first holes 310, the first guide grooves 38, the third holes 312, the second guide grooves 39, and the second holes 311, and only the first and second guide grooves 38, 39 need to be sealed. Each of the sealing units 40 is particularly designed to have the leakproof members 41, the square leakproof piece 42, and the arc-shaped cover 43, wherein the leakproof members 41 are used to seal the first and second guide grooves 38, 39 to form a first sealing structure for the first and second guide grooves 38, 39. Then the leakproof pieces 42 simultaneously seal the first and second guide grooves 38, 39 and the leakproof members 41 to serve as a second sealing structure of the first and second guide grooves 38, 39. Finally, the cover 43 is fixed to the nut 30 by countersunk head screws 44 and presses against the respective leakproof pieces 42, so as to form a third sealing structure of the first and second guide grooves 38, 39. Obviously, the first and second guide grooves 38, 39 of the cooling passage that require sealing operation are sealed with the sealing units 40 and the three sealing structures, which can truly improve the sealing property of the cooling passage.

Third, maintain the effective travel length of the nut. The nut 30 of the invention is designed to have the input cooling hole 36 and the output cooling hole 37 that are parallel to the axis 21, the three parallel first guide grooves 38 are defined in the first flat surface 34, the three parallel second guide grooves 39 are defined in the second flat surface 35, and then the first and second guide grooves 38, 39 are in communication with one another via the first, second and third holes 310, 311, 312. Finally, the sealing units 40 are fixed to the nut 30 to seal the first and second guide grooves 38, 39, and thus a ball screw with a cooling passage is completed. It can be seen from this that the invention adopts the radial orthogonal design, and there is no cooling passage in the axial direction of the nut. Therefore, the invention requires no use of axial block, which consequently won't increase the axial length of the nut 30, and the effective travel length of the nut 30 can be maintained.

Fourth, high applicability. Along the axial direction of the nut 30 are only formed the input and output cooling holes 36, 37, therefore, the invention has a large accessory space, and does not have to consider the positions of the flange oil hole and the wiper screw.

Figure 7:
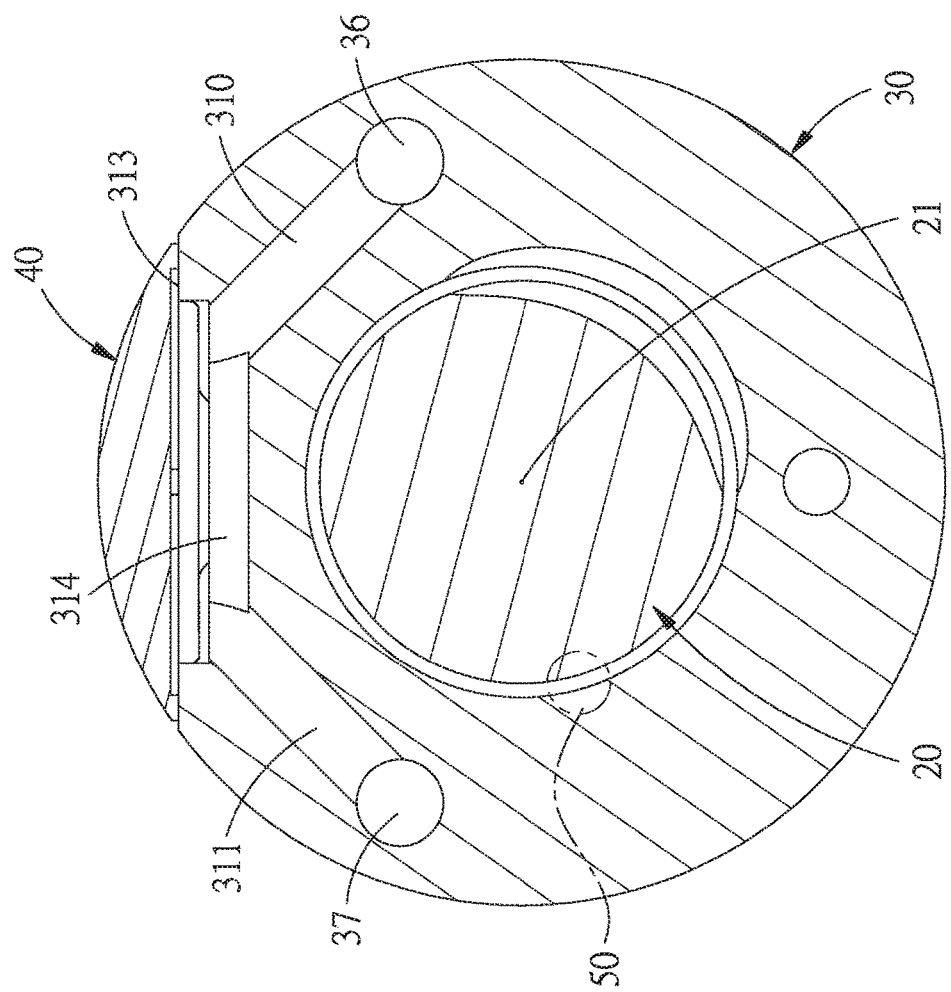
FIG. 7 is a cross sectional view of the nut of the second embodiment of the invention.

Referring to FIG. 7, a ball screw with a cooling passage in accordance with the second preferred embodiment of the invention comprises the screw 20, the nut 30 sleeved onto the screw 20, the plurality of balls 50 disposed between the screw 20 and the nut 30, and the sealing unit 40 mounted on the nut 30. The second embodiment is similar to the first embodiment, except for the following differences:

The nut 30 is provided with only one flat surface 313, three guide grooves 314 in the flat surface 313, three first holes 310 in communication with the guide grooves 314 and the input cooling hole 36, and a second hole 311 in communication with the guide grooves 314 and the output cooling hole 37. Similarly, the sealing unit 40 is mounted on the flat surface 313 of the nut 30 to seal the respective guide grooves 314, so that the input cooling hole 36, the first holes 310, the guide grooves 314, the second hole 311 and the output cooling hole 37 define the cooling passage.

While we have shown and described various embodiments in accordance with the present invention, it is clear to those skilled in the art that further embodiments may be made without departing from the scope of the present invention.

What is claimed is:

1. A ball screw with a cooling passage, comprising:
 a screw including an axis, an annular surface surrounding the axis, and an outer helical groove surrounding the axis and defined in the annular surface;
 a nut sleeved along the axis onto the screw, and including: an inner helical groove surrounding the axis and formed in an inner surface of the nut, a first axial end surface, a second axial end surface opposite to the first axial end surface, at least one flat surface, an input cooling hole and an output cooling hole defined in the first axial end surface and extending toward the second axial end surface, at least one guide groove defined in the flat surface, a first hole in communication with the at least one guide groove and the input cooling hole, a second hole in communication with the at least one guide groove and the output cooling hole, wherein the inner helical groove cooperates with the outer helical groove to form a load path for receiving a plurality of balls; and
 a sealing unit mounted on the flat surface of the nut and including a flat sealing surface for sealing the at least one guide groove, so that the input and output cooling holes cooperate with the first hole, the at least one guide groove, and the second hole to form the cooling passage.

2. The ball screw as claimed in claim 1, wherein the nut is provided with three said guide grooves which are arranged in a parallel manner.

3. The ball screw as claimed in claim 1, wherein the at least one guide groove of the nut further includes an annular shoulder portion, the sealing unit includes at least one leakproof member, a leakproof piece, and a cover, the at least one leakproof member includes a sealing portion for sealing the at least one guide groove, and an abutting portion for abutting against the annular shoulder portion, the leakproof piece is disposed on the nut and includes the flat sealing surface for sealing the guide groove and the at least one leakproof member, and the cover is fixed to the flat surface and presses against the leakproof piece.

4. A ball screw with a cooling passage, comprising:

a screw including an axis, an annular surface surrounding the axis, and an outer helical groove surrounding the axis and defined in the annular surface;

a nut sleeved along the axis onto the screw, and including: an inner helical groove surrounding the axis and formed in an inner surface of the nut, a first axial end surface, a second axial end surface opposite to the first axial end surface, a first flat surface, a second flat surface, an input cooling hole and an output cooling hole defined in the first axial end surface and extending toward the second axial end surface, at least one first guide groove defined in the first flat surface, at least one second guide groove defined in the second flat surface, a first hole in communication with the at least one first guide groove and the input cooling hole, a second hole in communication with the at least one second guide groove and the output cooling hole, and a third hole in communication with the first and second guide grooves, wherein the inner helical groove cooperates with the outer helical groove to form a load path for receiving a plurality of balls; and two sealing units mounted on the first and second flat surfaces of the nut, respectively, and each including a flat sealing surface for sealing the at least one first guide groove and the at least one second guide groove, so that the input and output cooling holes cooperate with the first hole, the at least one first guide groove, the third hole, the at least one second guide groove, and the second hole to form the cooling passage.

5. The ball screw as claimed in claim 4, wherein the nut is provided with three said first guide grooves and three said second guide grooves, and the three said first guide grooves and the three said second guide grooves are all arranged in a parallel manner.

6. The ball screw as claimed in claim 4, wherein the at least one first guide groove of the nut further includes a first annular shoulder portion, the at least one second guide groove of the nut further includes a second annular shoulder portion, each of the sealing units includes at least one leakproof member, a leakproof piece, and a cover, each of the leakproof members includes a sealing portion for sealing the first and second guide grooves, and an abutting portion for abutting against the first and second annular shoulder portions, the leakproof pieces are disposed on the nut and each include the flat sealing surface for sealing the first and second guide grooves and a corresponding one of the leakproof members, and the covers are fixed to the first and second flat surfaces and press against the leakproof pieces.

* * * * *